US008811828B2

(12) United States Patent
Olsson et al.

(10) Patent No.: US 8,811,828 B2
(45) Date of Patent: Aug. 19, 2014

(54) OPTICAL COMMUNICATIONS SYSTEM

(75) Inventors: Bengt-Erik Olsson, Hovas (SE); Jonas Martensson, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 122 days.

(21) Appl. No.: 13/636,121

(22) PCT Filed: Mar. 19, 2010

(86) PCT No.: PCT/EP2010/053597
§ 371 (c)(1),
(2), (4) Date: Sep. 19, 2012

(87) PCT Pub. No.: WO2011/113493
PCT Pub. Date: Sep. 22, 2011

(65) Prior Publication Data
US 2013/0022362 A1  Jan. 24, 2013

(51) Int. Cl.
*H04B 10/61* (2013.01)
(52) U.S. Cl.
USPC .............................................. 398/204; 398/72
(58) Field of Classification Search
CPC ... H04B 10/61; H04B 10/6166; H04J 14/002; H04J 14/0298
USPC .......... 398/68–73, 79–97, 140–153, 203–207
See application file for complete search history.

(56) References Cited

U.S. PATENT DOCUMENTS 8,467,690 B2 * 6/2013 Kim et al. ..................... 398/194

FOREIGN PATENT DOCUMENTS

EP  0 532 021 A2  3/1993

OTHER PUBLICATIONS

Fong et el. "Coherent Analog Optical Links: Design, Performance and Potential Applications" Global Telecommunications Conference, 1993, Including a Communications Theory Mini-Conference. Technical Program Conference Record, IEEE in Houston, GLOBECOM'93, IEEE Houston, TX, Nov. 29- Dec. 2, 1993, New York, NY, IEEE, Nov. 29, 1993. pp. 1886-1890, XP010109966.

Hui et al. "Subcarrier Muitiplexing for High-Speed Optical Transmission" Journal of Lightwave Technology, IEEE Service Center, New York, NY, vol. 20, No. 3, Mar. 1, 2002, pp. 417-427, XP011030141.

* cited by examiner

*Primary Examiner* — Leslie Pascal
(74) *Attorney, Agent, or Firm* — Rothwell, Figg, Ernst & Manbeck, P.C.

(57) ABSTRACT

An optical communications system (300, 400, 500) comprising a first transmit unit (301, 401, 402) and a first receive unit (302, 401, 402). The first transmit unit comprises an electro-optical modulator (311) for modulating one or more radio channels bearing electrical signals with a total bandwidth B by a laser signal (310) with a laser frequency $f_{L1}$, and the first transmit unit also comprises a transmit filter for outgoing signals from the electro-optical modulator. The first receive unit comprises an electro-optical demodulator (313) for demodulating the one or more electrical signals received from the first transmit unit by means of a Local Oscillator, LO (312), which produces an optical signal at a second frequency $f_{L2}$, and B ranges from the lower of $f_{L1}$ and $f_{L2}$ to the higher of $f_{L1}$ and $f_{L2}$.

8 Claims, 5 Drawing Sheets

OPTICAL COMMUNICATIONS SYSTEM

CROSS REFERENCE TO RELATED APPLICATION

This application is a 35 U.S.C. §371 National Phase Entry Application from PCT/EP2010/053597, filed Mar. 19, 2010, designating the United States, the disclosure of which is incorporated herein in its entirety by reference.

TECHNICAL FIELD

The present invention discloses an optical communications system.

BACKGROUND

In optical transmission systems, so called sub-carrier multiplexing/demultiplexing, SCM, is an attractive technology, particularly in systems operating at 100 Gbit/s and above. However, the presence of so called "mirror signals" makes it necessary to utilize filters with extremely sharp filter characteristics, or unwanted signals will be admitted into the system.

SUMMARY

There is thus a need for an optical communications system in which Sub Carrier Modulation, SCM, can be used, while the need for transmit or receive filters with extremely sharp filter characteristics can be obviated.

This need is addressed by the present invention in that it discloses an optical communications system which comprises a first transmit unit and a first receive unit. The first transmit unit comprises an electro-optical modulator for modulating one or more radio channels bearing electrical signals with a total bandwidth B by a laser signal with a laser frequency $f_{L1}$, and the first transmit unit also comprises a transmit filter for outgoing signals from the electro-optical modulator.

The first receive unit also comprises an electro-optical demodulator for demodulating the one or more electrical signals received from the first transmit unit by means of a Local Oscillator, LO, which produces an optical signal at a second frequency $f_{L2}$. According to the invention, in the optical communications system the bandwidth B of the transmitted radio channels ranges from the lower of $f_{L1}$ and $f_{L2}$ to the higher of $f_{L1}$ and $f_{L2}$.

In one embodiment of the invention, the first receive unit is comprised in a first transponder unit which also comprises a transmit unit with an electro-optical modulator for modulating one or more electrical radio channels bearing electrical signals with a total bandwidth B by a laser signal with a laser frequency $f_3$, and the first transmit unit is comprised in a second transponder unit which also comprises a receive unit with an electro-optical demodulator for demodulating the one or more electrical signals received from the transmit unit of the first transponder unit by means of a Local Oscillator, LO, which produces an optical signal at a second frequency $f_4$, where $f_3$ equals $f_2$ and $f_4$ equals $f_1$.

In one embodiment, the laser frequency of the transmit unit and the LO frequency of the receive unit of at least one transponder unit are switchable, and the at least one transponder unit is equipped with a control unit which, when the transponder is not in communication with another transponder, controls the transmit unit and the frequency unit to switch between using the following combinations of laser and LO frequencies:

laser frequency $f_1$, LO frequency $f_2$,
laser frequency $f_3$, LO frequency $f_4$.

Suitably, the switching goes on until the at least one transponder is in communication with another transponder.

The invention also discloses a corresponding method for use in an optical communications system.

BRIEF DESCRIPTION OF THE DRAWINGS

The invention will be described in more detail in the following, with reference to the appended drawings, in which.

DETAILED DESCRIPTION

Figure 1:
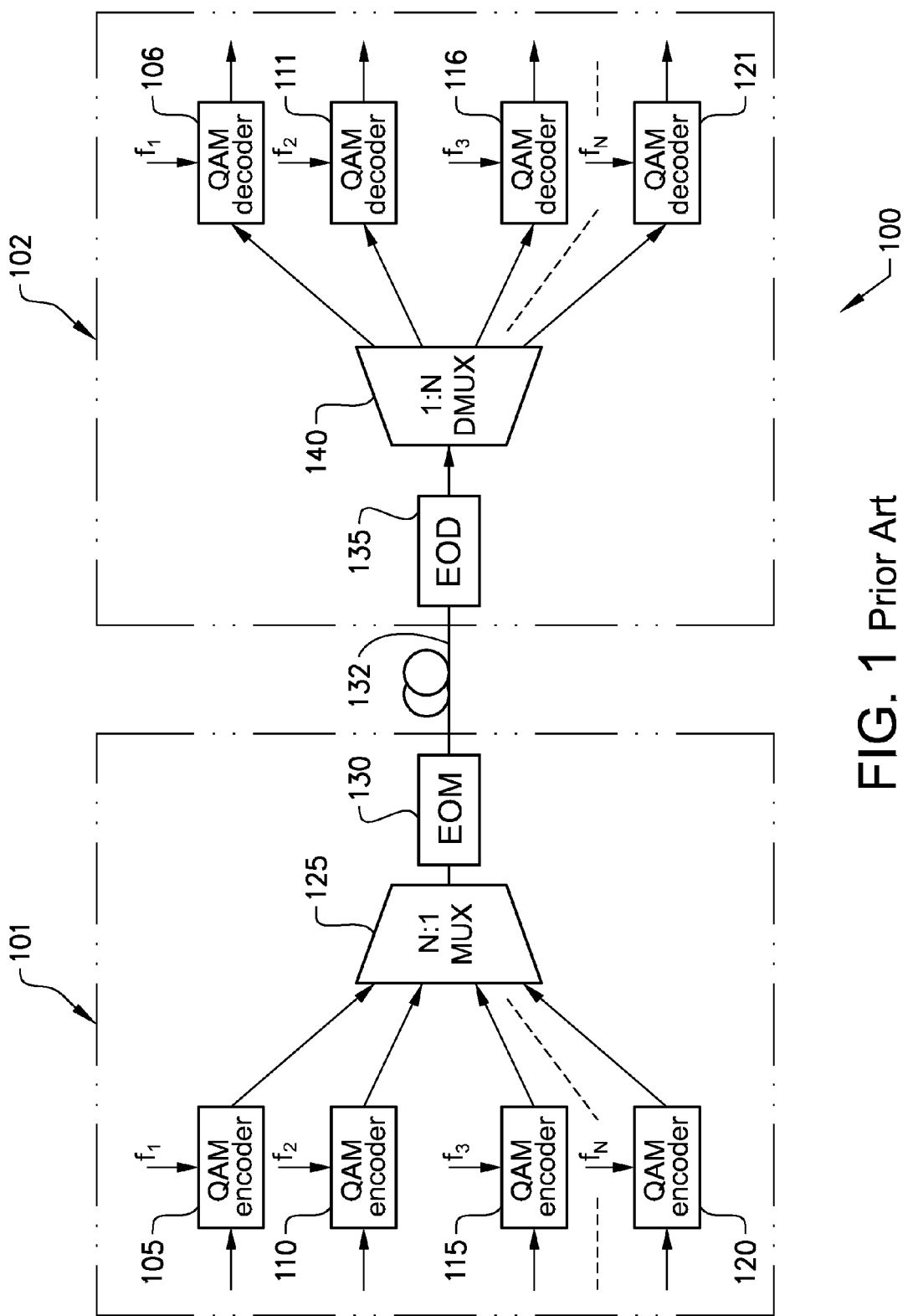
FIG. 1 shows a prior art system.

FIG. 1 shows a schematic overview of a prior art system 100. The system 100 is a so called SCM system, sub-carrier multiplexing/demultiplexing. As shown in FIG. 1, the SCM system 100 comprises a transmit unit 101 which in turn comprises N encoders. In FIG. 1, four encoders, 105, 110, 115, 120, are shown, each of which encodes a data stream by means of a certain modulation principle, in this case so called Quadrature Amplitude Modulation, QAM, at an RF carrier frequency $f_1$-$f_N$. The encoded N data streams are then combined in an N-to-1 combiner or multiplexer 125, where the combined signal which is output from the combiner 125 has a total bandwidth of B.

The output signal from the combiner is then used as input to an electro-optical modulator, an EOM 130, in which the electrical RF signal is converted to an optical signal by means of a light source, in this case a laser, at a laser frequency $f_{L1}$, by means of amplitude, intensity or phase modulation.

Following this, the optical signal from the EOM 130 is then filtered through a transmit filter (not shown in FIG. 1) and is then transmitted over an optical transmission channel 132 such as an optical fibre.

The system 100 also comprises a receive unit 102, in which the transmitted optical signal is received by an electro-optical demodulator, EOD 135, in which it is demodulated and converted to an electrical RF signal by means of an optical LO signal at an optical frequency $f_{L2}$. The demodulated signal is then "de-multiplexed" in a splitter or "demux" 140, into N signals, each of which is decoded in one of N decoders, in this case four QAM decoders 106, 111, 116, 121.

Figure 2:
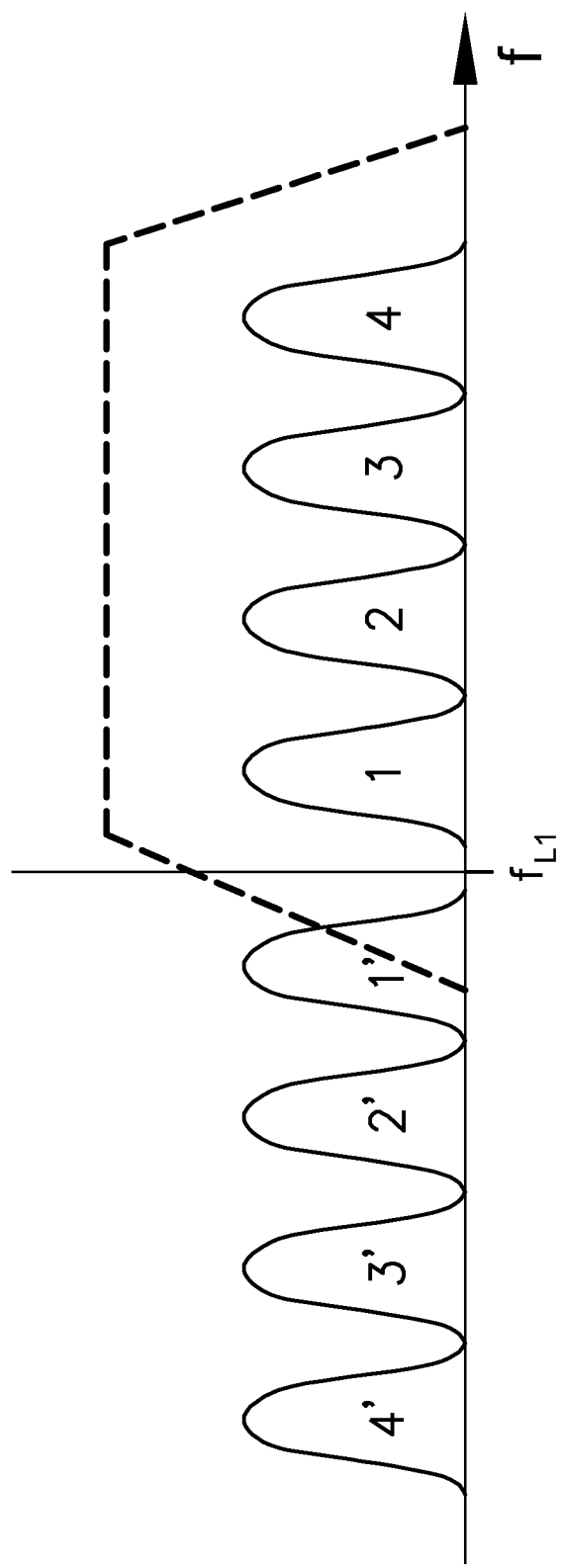
FIG. 2 illustrates a problem to be addressed by the invention.

A drawback of the system shown in FIG. 1 and described above is that mirror signals to the N data streams are created in the EOM, the electro-optical modulator. This is shown for the case of N=4 in FIG. 2, where the laser frequency $f_{L1}$ is also shown. As can be seen, the mirror signals 1', 2', 3', 4', are created symmetrically about the modulating laser frequency $f_{L1}$. If the laser LO signal $f_{L2}$ on the receiver side is placed at or about the same frequency, i.e. $f_{L1}$, a filter on the receive side will have to have extremely sharp filter characteristics. An example of such a filter is shown with dotted lines, and as can be seen, even a filter with extremely sharp characteristics will be unable to prevent some degree of residue from the mirror signals from being transmitted to the receive side of the system. Naturally, the number of channels can vary, four is merely an example intended to illustrate the principle involved.

In order to obviate this problem, i.e. to facilitate the removal of mirror frequencies by means of a filter on the receive side, the invention discloses an electro-optical communication system in which the frequency $f_{L1}$ of the modulating laser in the transmitter and the laser frequency $f_{L2}$ of the demodulating electrical LO signal in the receiver are placed at "opposite ends" of the total bandwidth B of the transmitted N signals. It should be pointed out that according to the invention, either of $f_{L1}$ and $f_{L2}$ can be placed at either end of the bandwidth B. In other words, the relationship between $f_{L1}$, $f_{L2}$ and B will be that B ranges from the lower of $f_{L1}$ and $f_{L2}$ to the higher of $f_{L1}$ and $f_{L2}$.

Figure 3:
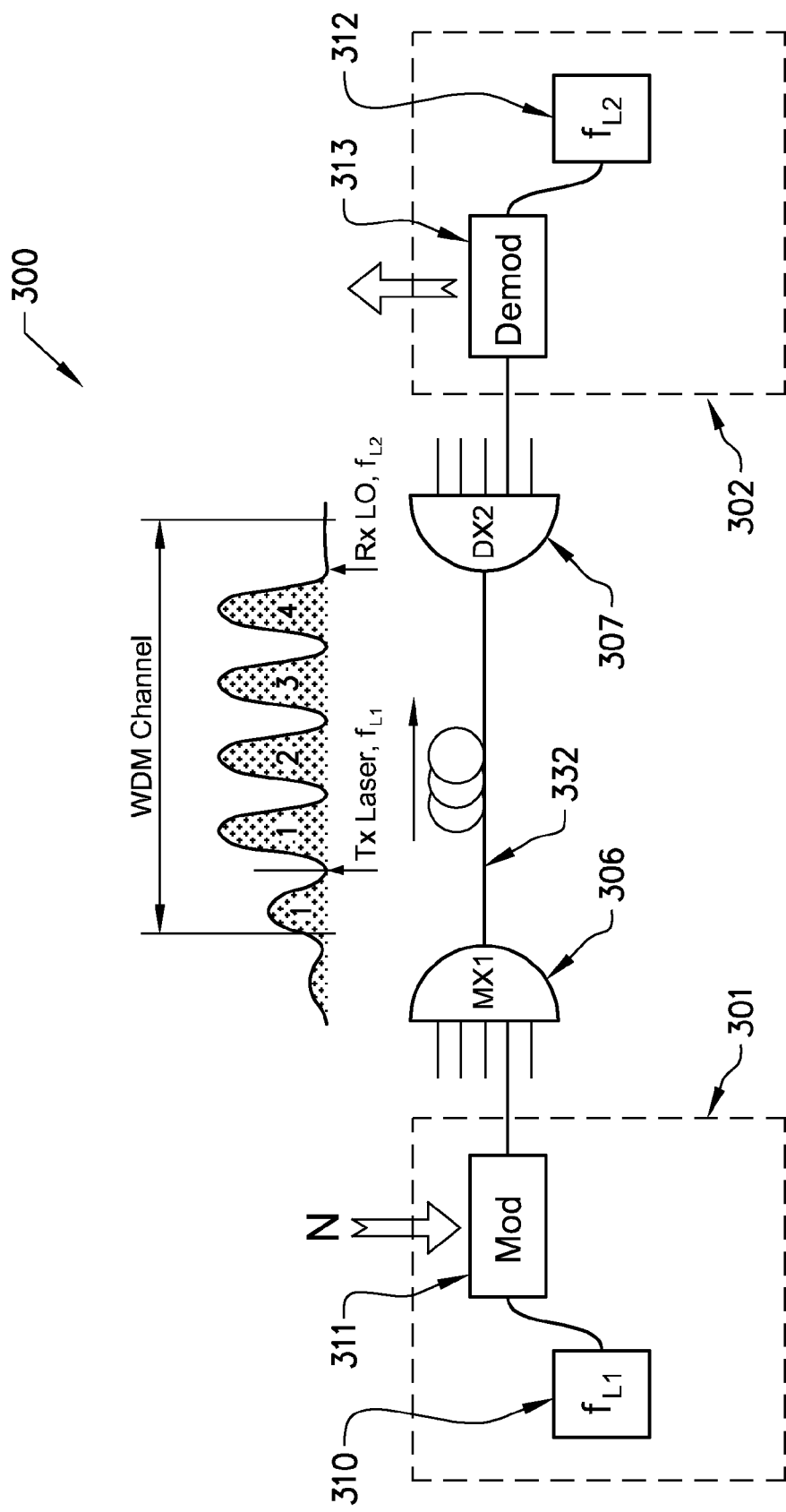
FIG. 3 shows a first embodiment of the invention.

This principle of the invention is illustrated in FIG. 3, which shows a system 300 with a transmit unit 301 and a receive unit 302. The transmit unit 301 comprises a modulator 311 and a laser 310, preferably a so called Tunable Laser Diode, a TLD, which operates at a frequency $f_{L1}$. The laser 310 modulates N data streams with a bandwidth B by means of the laser signal at the frequency $f_{L1}$ in the modulating unit 311. The modulated signal is then transmitted via an optical channel 332 such as an optical fibre. Also shown is an optional optical multiplexer 306, which serves to multiplex the signal from the transmit unit 301 into one optical output signal together with optical signals from other transmit units such as the one 301.

After or in the optical multiplexer 306, if this component is included in the system, the signal is passed through a transmit filter, which is usually included in the optical multiplexer, and then onto an optical channel 332 such as an optical fibre. The bandwidth of the transmitted optical signal is here denoted as B.

The system 300 also comprises a receive unit 302, and, if the optical multiplexer 306 is used, there is also comprised a de-multiplexer 307. The receive unit 302 also comprises of an electro-optical demodulator 313 which demodulates the signal with the bandwidth B by means of an optical LO signal at a laser frequency $f_{L2}$ from a laser 312, suitably a TLD here as well. As mentioned before, according to the invention, the relationship between the frequencies $f_{L1}$ and $f_{L2}$ and the bandwidth B is such that $f_{L1}$ and $f_{L2}$ are placed at opposite ends of B, one of them being placed at each end, which can also be expressed as saying that B ranges from the lower of $f_{L1}$ and $f_{L2}$ to the higher of $f_{L1}$ and $f_{L2}$. As noted, either of $f_{L1}$ and $f_{L2}$ can be placed at either end of B.

Figure 4:
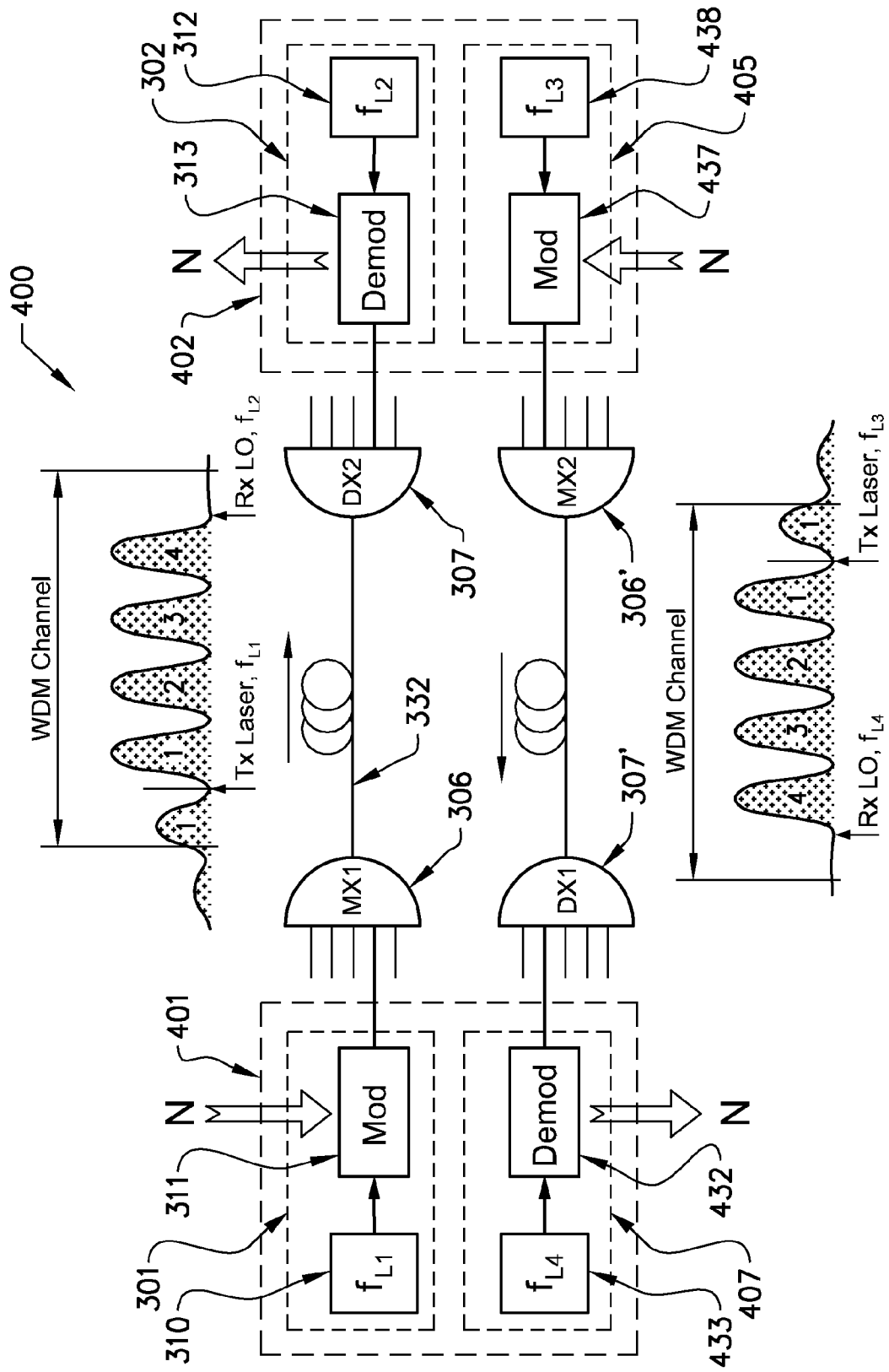
FIG. 4 shows a second embodiment of the invention.

FIG. 4 shows another embodiment 400 of a system of the invention. The embodiment 400 comprises a transponder at both ends of the system, i.e. both ends of the system comprise a transmit unit and a receive unit, so that there is a first transponder 401 which comprises the transmit unit 301 as described above in connection to FIG. 3 as well as a receive unit 407 with a demodulator 432 and a laser 433 at frequency $f_{L4}$, and a second transponder 402 which comprises the receive unit 302 as described above in connection to FIG. 3, i.e. the laser 310 and the modulating unit 311 as well as a transmit unit 405 which comprise a modulator 437 and a laser 438 which operates at frequency $f_{L3}$.

The function of the transmit unit 301, 405, in both transponders 401, 405 corresponds to the function of the transmitter 301 as described above, and the function of the receiver in both transponders corresponds to the function of the receiver 302 as described above. However, the receiver of the first transponder 401 has an optical LO 433 which operates at a frequency of $f_4$, and the transmitter of the second transponder 402 has a modulating laser 438 which operates at a frequency of $f_3$.

According to the invention, the relationships between the frequencies in the system 400 and the bandwidth B of the transmitted signals is as follows: the frequency of the laser in the transmitter of a transponder corresponds to the frequency of the optical LO in the same transponder, and the spectral distance between the frequency of the laser in the transmitter of one transponder and the frequency of the optical LO in the other transponder corresponds to the bandwidth B of the transmitted signals. Using the notations above for the various LO and laser frequencies, this can also be expressed as saying that $f_3$ equals $f_2$ and $f_4$ equals $f_1$.

Figure 5:
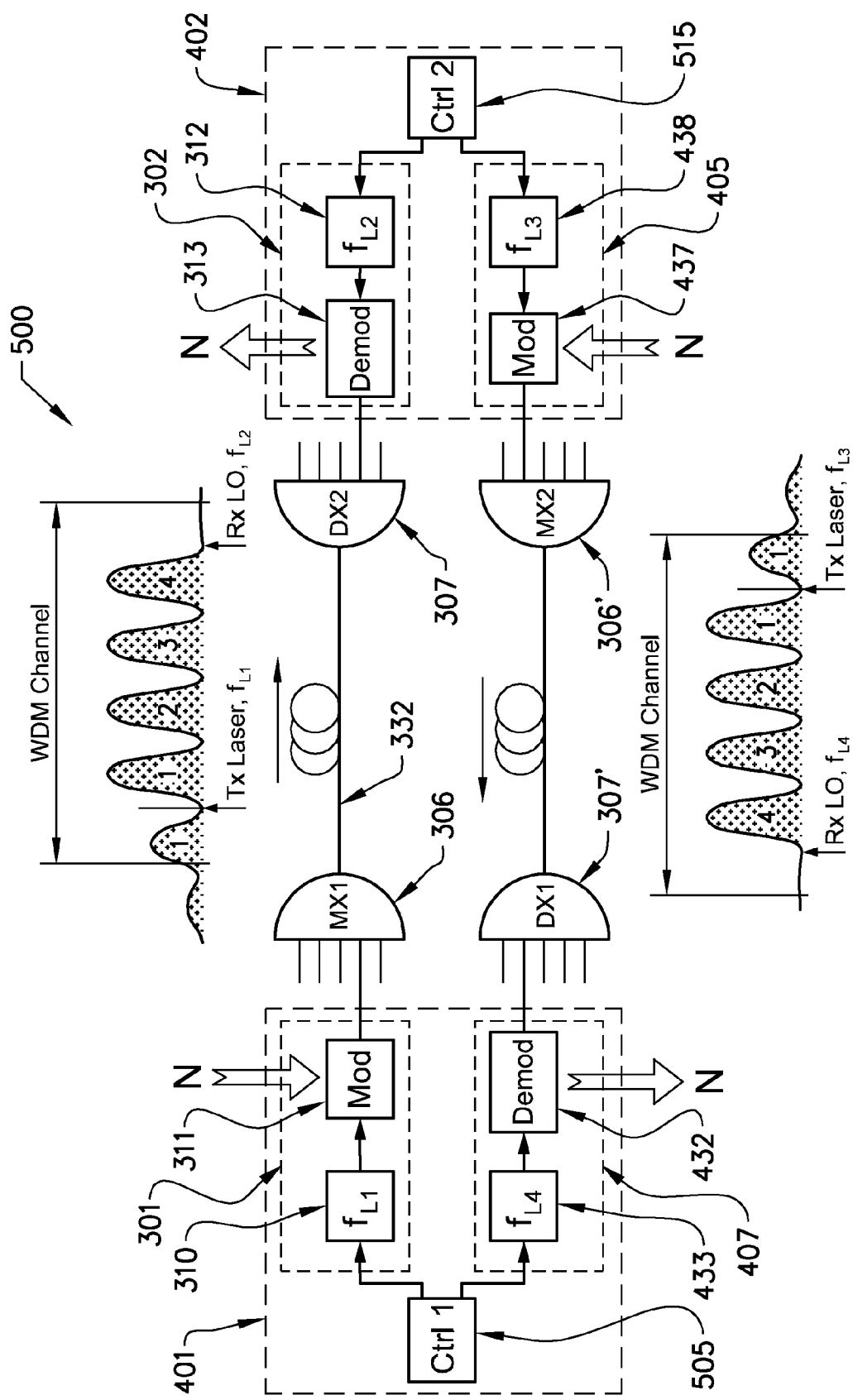
FIG. 5 shows a third embodiment of the invention.

FIG. 5 shows a further embodiment of the invention. Since a transponder of the invention may not always be connected to another transponder, and since the frequencies of the laser and the LO of the transponder according to the invention at least in this embodiment are "switchable", i.e. either frequency can be at either end of the bandwidth B, there is a need to set the frequencies at the proper ends of the bandwidth B with respect to how they are set in another transponder to which the transponder attempt to connect and establish communication with.

This need is met by the introduction of a control unit 505, 515, as shown in FIG. 5, which controls the respective transponder 401, 402, by switching the laser frequency of the modulating unit and the optical frequency of the LO of the transponder until the transponder is in communication with another transponder which meets the conditions set out above, i.e. that the transmit laser frequency of "transponder 1" matches the receive LO frequency of "transponder 2" and vice versa, that the receive LO frequency of "transponder 1" matches the transmit laser frequency of "transponder 2".

It should be noted that the invention discloses the system 500 shown in FIG. 5 as well as one or more of the individual transponders 401, 402 shown in FIG. 5, i.e. a transponder in which the laser frequencies (transmit and LO) are switchable, and the transponder is controllable by its control unit, so that, when the transponder is not in communication with another transponder, the control unit controls the transmit unit and the frequency unit to switch between using the following two combinations of laser and LO frequencies:

laser frequency $f_{L1}$, LO frequency $f_{L4}$,
laser frequency $f_{L2}$, LO frequency $f_{L3}$.

It can also be noted that the frequency pairs $f_{L1}$, $f_{L4}$, and $f_{L2}$, $f_{L3}$, are pair-wise located at either end of the bandwidth B, i.e. $f_{L1}$, $f_{L4}$, are equal to one another and $f_{L2}$, $f_{L3}$ are also equal to one another, with these two pairs being located at either end of the bandwidth B.

It should be noted that additional combinations of laser and LO frequencies with a distance of B between them can also be used by a transponder of the invention.

In one embodiment of either a transponder or a system as shown in FIG. 5, the switching is performed periodically, with at least two different periods which are alternated between, so that a first periodicity is maintained during a first period of time and a second periodicity is maintained during a second period of time. This is done so that the risk of two transponders which attempt to connect to each other have minimal risk of "matching paces" with each other.

The invention is not limited to the examples of embodiments described above and shown in the drawings, but may be freely varied within the scope of the appended claims.

The invention claimed is:

1. An optical communications system comprising a first transmit unit and a first receive unit, with the first transmit unit comprising an electro-optical modulator for modulating one or more data streams with a total bandwidth B into an optical signal by a laser signal with a laser frequency $f_{L1}$, the first transmit unit also comprising a transmit filter for outgoing signals from the electro-optical modulator, the first receive unit comprising an electro-optical demodulator for demodulating the optical signal received from the first transmit unit using a Local Oscillator, LO, which produces an optical signal at a second frequency $f_{L2}$, wherein the valves for $f_{L1}$ and $f_{L2}$ are set at opposite ends of B, which ranges from the lower of $f_{L1}$ and $f_{L2}$ to the higher of $f_{L1}$ and $f_{L2}$.

2. The optical communications system of claim 1, further comprising a first transponder unit which comprises the first receive unit and a transmit unit with an electro-optical modulator for modulating one or more data streams with a total bandwidth B into an optical signal by a laser signal with a laser frequency $f_{L3}$, and a second transponder unit which comprises the first transmit unit and a receive unit with an electro-optical demodulator for demodulating the optical signal received from the transmit unit of the first transponder unit by using a Local Oscillator, LO, which produces an optical signal at a second laser frequency $f_{L4}$, where $f_{L3}$ equals $f_{L2}$ and $f_{L4}$ equals $f_{L1}$.

3. The optical communications system claim 2, in which the laser frequency of the transmit unit and the LO frequency of the receive unit of at least one transponder unit are switchable, and said at least one transponder unit comprises a control unit which, when the transponder is not in communication with another transponder, controls the transmit unit and the frequency unit to switch between using the following combinations of laser and LO frequencies:
  laser frequency $f_{L2}$, LO frequency $f_{L4}$, and
  laser frequency $f_{L2}$, LO frequency $f_{L3}$.

4. The optical communications system of claim 3, in which the switching is maintained until the at least one transponder is in communication with another transponder.

5. The optical communications system of claim 3, in which the switching is performed periodically, with at least two different periods which are alternated between, so that a first periodicity is maintained during a first period of time and a second periodicity is maintained during a second period of time.

6. An optical transponder comprising a transmit unit and a receive unit, with the transmit unit comprising an electro-optical modulator for modulating one or more data streams with a total bandwidth B into an optical signal by a laser signal with a laser frequency $f_{L1}$, and with the receive unit comprising an electro-optical demodulator for demodulating the optical signal by using Local Oscillator, LO, which produces an optical signal at a second laser frequency $f_{L2}$, with $f_{L1}$ equaling $f_{L2}$, and wherein the laser frequency of the transmit unit and of the LO are switchable, and the transponder further comprises a control unit which, when the transponder is not in communication with another transponder, controls the transmit unit and the frequency unit to switch between using the following combinations of transmit unit laser frequencies and receive unit laser LO frequencies:
  transmit unit laser frequency $f_{L1}$, receive unit laser LO frequency $f_{L4}$, and
  transmit unit laser frequency $f_{L2}$, receive unit laser LO frequency $f_{L3}$,
where the frequency pairs $f_{L1}$, $f_{L4}$, and $f_{L2}$, $f_{L3}$, are pair-wise located at either end of the bandwidth B.

7. The optical transponder claim 6, in which the switching is maintained until the transponder is in communication with another transponder.

8. The optical transponder of claim 6, in which the switching is performed periodically, with at least two different periods which are alternated between, so that a first periodicity is maintained during a first period of time and a second periodicity is maintained during a second period of time.

* * * * *

UNITED STATES PATENT AND TRADEMARK OFFICE
CERTIFICATE OF CORRECTION

| | |
|---|---|
| PATENT NO. | : 8,811,828 B2 |
| APPLICATION NO. | : 13/636121 |
| DATED | : August 19, 2014 |
| INVENTOR(S) | : Olsson et al. |

Page 1 of 1

It is certified that error appears in the above-identified patent and that said Letters Patent is hereby corrected as shown below:

In the Claims

In Column 5, Line 18, in Claim 3, delete "system" and insert -- system of --, therefor.

In Column 5, Line 26, in Claim 3, delete "$f_{L2}$," and insert -- $f_{L1}$, --, therefor.

In Column 6, Line 10, in Claim 6, delete "using Local" and insert -- using a Local --, therefor.

In Column 6, Line 24, in Claim 7, delete "transponder" and insert -- transponder of --, therefor.

Signed and Sealed this
First Day of September, 2015

Michelle K. Lee
*Director of the United States Patent and Trademark Office*